US009820273B2

(12) United States Patent
Zhang et al.

(10) Patent No.: US 9,820,273 B2
(45) Date of Patent: Nov. 14, 2017

(54) UPLINK COORDINATED MULTIPOINT COMMUNICATIONS IN A WIRELESS NETWORK

(76) Inventors: Xiaoxia Zhang, San Diego, CA (US); Hao Xu, San Diego, CA (US); Renqiu Wang, San Diego, CA (US); Zhifei Fan, San Diego, CA (US)

(*) Notice: Subject to any disclaimer, the term of this patent is extended or adjusted under 35 U.S.C. 154(b) by 532 days.

(21) Appl. No.: 13/037,213

(22) Filed: Feb. 28, 2011

(65) Prior Publication Data
US 2012/0057535 A1 Mar. 8, 2012

Related U.S. Application Data

(60) Provisional application No. 61/309,727, filed on Mar. 2, 2010.

(51) Int. Cl.
*H04W 72/04* (2009.01)

(52) U.S. Cl.
CPC ....... *H04W 72/0426* (2013.01); *H04W 72/04* (2013.01)

(58) Field of Classification Search
CPC .................................. H04W 72/0413
See application file for complete search history.

(56) References Cited

U.S. PATENT DOCUMENTS

| 2011/0077020 A1 | 3/2011 | Zangi |
| 2011/0201341 A1* | 8/2011 | Choudhury ....... H04W 72/0426 455/450 |
| 2011/0237270 A1* | 9/2011 | Noh ................ H04B 7/0413 455/450 |
| 2012/0044870 A1 | 2/2012 | Mochizuki et al. |
| 2012/0106473 A1* | 5/2012 | Tiirola et al. ................. 370/329 |

FOREIGN PATENT DOCUMENTS

| EP | 2076084 A1 | 7/2009 |
| JP | 5079139 B2 | 11/2012 |
| WO | WO-2010124716 A1 | 11/2010 |
| WO | WO-2010125738 A1 | 11/2010 |

OTHER PUBLICATIONS

Yuan et al., Carrier Aggregation for LTE-Advanced Mobile Communication Systems, Feb. 2010.*

(Continued)

*Primary Examiner* — Faruk Hamza
*Assistant Examiner* — Aixa Guadalupe-Cruz
(74) *Attorney, Agent, or Firm* — Holland & Hart LLP

(57) ABSTRACT

Devices, systems, methods and/or computer program products are provided to facilitate coordinated multipoint transmission and reception of communications in a wireless network. In some scenarios, different set of resources are allocated for uplink transmissions of multiple user equipment. In other scenarios collision avoidance and/or multiplexing techniques are used to enable reception and decoding of multiple uplink transmissions on the same or overlapping resources at the same time. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

50 Claims, 7 Drawing Sheets

(56) References Cited

OTHER PUBLICATIONS

Catt: "Consideration on CoMP in RAN3", 3GPP Draft; R3-091245, 3rd Generation Partnership Project (3GPP), Mobile Competence Centre ; 650, Route Des Lucioles ; F-06921 Sophia-Antipolis Cedex ; France, No. San Francisco, USA; 20090429, Apr. 29, 2009 (Apr. 29, 2009), XP050341603, [retrieved on Apr. 29, 2009].

Catt: "Proposal of multiple sites coordination for LTE-A TDD", 3GPP Draft; R1-083631, 3rd Generation Partnership Project (3GPP), Mobile Competence Centre ; 650, Route Des Lucioles ; F-06921 Sophia-Antipolis Cedex ; France, No. Prague, Czech Republic; Sep. 28, 2008, Sep. 28, 2008 (Sep. 28, 2008), XP050316989, [retrieved on Sep. 28, 2008].

CMCC: "UL CoMP Scheme and System Level Performance Evaluation", 3GPP Draft; R1-090923, 3rd Generation Partnership Project (3GPP), Mobile Competence Centre ; 650, Route Des Lucioles ; F-06921 Sophia- Antipolis Cedex ; France, No. Athens, Greece; 20090206, Feb. 6, 2009 (Feb. 6, 2009), XP050318764, [retrieved on Feb. 6, 2009].

International Search Report and Written Opinion—PCT/US2011/026899—ISA/EPO—dated May 23, 2011.

Orange: "CoMP with limited backhaul capabilities", 3GPP Draft; R1-094304, 3rd Generation Partnership Project (3GPP), Mobile Competence Centre ; 650, Route Des Lucioles ; F-06921 Sophia-Antipolis Cedex ; France, No. Miyazaki; Oct. 12, 2009, Oct. 12, 2009 (Oct. 12, 2009), XP050388763, [retrieved on Oct. 6, 2009].

Panasonic: "Discussion on PUCCH coordination for UL CoMP", 3GPP Draft; R1-091165, 3rd Generation Partnership Project (3GPP), Mobile Competence Centre ; 650, Route Des Lucioles ; F-06921 Sophia-Antipolis Cedex ; France, No. Seoul, Korea; Mar. 17, 2009, Mar. 17, 2009 (Mar. 17, 2009), XP050338786, [retrieved on Mar. 17, 2009].

European Search Report—EP15177823—Search Authority—Munich—Dec. 3, 2015.

* cited by examiner

UPLINK COORDINATED MULTIPOINT COMMUNICATIONS IN A WIRELESS NETWORK

The present application claims the benefit of and priority to U.S. Provisional Patent Application Ser. No. 61/309,727 entitled "Method And Apparatus For Uplink COMP On PUSCH, PUCCH and PRACH Channels," filed Mar. 2, 2010, the entirety of which is incorporated herein by reference.

FIELD OF INVENTION

The present application relates generally to the field of wireless communications and, more particularly, to transmission and reception of uplink communications in a network.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and other content. These systems may be multiple-access communication systems capable of supporting communication with multiple users by sharing the available system resources (e.g., bandwidth and transmit power). Examples of such multiple-access communication systems include code division multiple access (CDMA) systems, time division multiple access (TDMA) systems, frequency division multiple access (FDMA) systems, Long Term Evolution (LTE) systems (including 3GPP systems), and orthogonal frequency division multiple access (OFDMA) systems.

Generally, a wireless multiple-access communication system can simultaneously support communication for multiple wireless terminals. Each terminal, or user equipment (UE), communicates with one or more base stations through transmissions on forward and reverse links. The forward link (or downlink) refers to the communication link from the base stations to the user equipment, and the reverse link (or uplink) refers to the communication link from the user equipment to the base stations. This communication link can be established through a single-in-single-out (SISO), multiple-in-single-out (MISO) or a multiple-in-multiple-out (MIMO) system.

In some wireless communication systems, such as LTE Advanced (LTE-A) systems, two or more base stations (or eNodeBs) may cooperate with one another to increase the effective communication range of the wireless network and/or to improve the quality of received and transmitted signals. In the downlink, a user equipment can benefit from transmissions that can originate from any one of a plurality of eNodeBs that are in communication with one another. Further, in some scenarios, a user equipment can receive multiple coordinated downlink transmissions, which after further processing, can produce signals of superior quality.

SUMMARY

This section is intended to provide a summary of certain exemplary embodiments and is not intended to limit the scope of the disclosed embodiments.

The disclosed embodiments relate to systems, methods, apparatuses and computer program products that facilitate uplink communications in a coordinated multipoint (CoMP) set of eNodeBs. One exemplary embodiment, relates to a method for wireless communication that comprises identifying, by a serving eNodeB, one or more non-serving eNodeBs that together with the serving eNodeB form a coordinated multipoint (CoMP) set. The method further includes transmitting uplink configuration information from the serving eNodeB to the one or more non-serving eNodeBs to facilitate coordinated uplink operation of the CoMP set. The method also includes receiving, at the serving eNodeB, uplink communications originated from one or more user equipment, where the received uplink communications having been transmitted in accordance with the uplink configuration information.

In another exemplary embodiment, the uplink configuration information identifies a first set of resources that are allocated by a first eNodeB in the CoMP set for scheduled uplink transmissions of a first user equipment on a physical uplink shared channel (PUSCH). The uplink configuration information may be used to avoid or prohibit a second eNodeB in the CoMP set from scheduling uplink transmissions for other user equipment on a second set of resources that at least partially overlap with the first set of resources. In one example, the first eNcodeB is the serving eNodeB and the second eNodeB is a non-serving eNodeB.

In one exemplary embodiment, the uplink configuration information identifies a first set of resources that are allocated by the serving eNodeB for scheduled uplink transmissions of a first user equipment on a physical uplink shared channel (PUSCH). The uplink configuration information may authorize a non-serving eNodeB in the CoMP set to schedule uplink transmissions for a second user equipment on a second set of resources that at least partially overlap with the first set of resources in one or both of a time domain and a frequency domain. In one example, the uplink configuration information identifies a spatial division multiple access (SDMA) technique for uplink transmissions on the first and the second set of resources. For instance, the spatial division multiple access (SDMA) technique can comprise at least one of coordinated beam forming and precoding techniques.

In another exemplary embodiment, where an SDMA technique is utilized, the rank of a user equipment associated with of the CoMP set is determined in accordance with Min {Tx, Rx(all)}, where Min represents the minimum value, Tx represents the number of transmit channels of the user equipment and Rx(all) represents the number of receive channels of all eNodeB in the CoMP set. In one example, a bitwidth allocation associated with the rank indicator in an uplink grant is determined in accordance with Min {Tx, Rx(all)}.

In still another exemplary embodiment, the uplink communications received at the serving eNodeB comprise uplink transmissions that are initially received at a particular non-serving eNodeB and subsequently conveyed to the serving eNodeB by the particular non-serving eNodeB. In one example, the serving eNodeB is configured to receive the conveyed uplink transmissions over a backhaul communication channel or an over-the-air communication channel. In another example, where the uplink transmissions are conveyed to the serving eNodeB, the method further comprises transmitting an acknowledgment (ACK) by the serving eNodeB to the user equipment from which the uplink communications were originated.

In one exemplary embodiment, the uplink configuration information identifies a first set of resources that are allocated for transmission of sounding reference signal (SRS) transmissions associated with the serving eNodeB. The uplink configuration information can identify one or more parameters associated with a multiplexing technique for transmission of sounding reference signals (SRSs) associated with the one or more non-serving eNodeBs in the CoMP set on a second set of resources that at least partially overlap with the first set of resources in one or both of a time domain and a frequency domain. In one example, the multiplexing technique can be selected from a group of multiplexing techniques that include: code division multiplexing, frequency division multiplexing, and/or time division multiplexing.

In another exemplary embodiment, the uplink configuration information identifies a first set of resources that are allocated for physical uplink control channel (PUCCH) transmissions from a first user equipment associated with the serving eNodeB. The uplink configuration information may be used to avoid or prohibit physical uplink control channel (PUCCH) transmissions from a second user equipment on a second set of resources that at least partially overlap with the first set of resources.

In yet another exemplary embodiment, the uplink configuration information identifies a first set of resources that are allocated for physical uplink control channel (PUCCH) transmissions from a first user equipment associated with the serving eNodeB. The uplink configuration information can authorize physical uplink control channel (PUCCH) transmissions from a second user equipment on a second set of resources that at least partially overlap with the first set of resources in one or both of a time domain and frequency domain. In one example, the physical uplink control channel (PUCCH) transmissions are carried out in accordance with a multiplexing techniques which may be selected from a group of multiplexing techniques including: code division multiplexing, frequency division multiplexing, and/or time division multiplexing. In another example, one or more eNodeBs in the CoMP set dynamically or semi-statically configure the first and the second set of resources for PUCCH transmissions.

In one exemplary embodiment, the uplink configuration information identifies a first set of resources that are allocated for physical random access channel (PRACH) transmissions from a first user equipment. The uplink configuration information may be used to avoid or prohibit physical random access channel (PRACH) transmissions from a second user equipment on a second set of resources that at least partially overlap with the first set of resources.

In another exemplary embodiment, the uplink configuration information identifies a first set of resources that are allocated for physical random access channel (PRACH) transmissions from a first user equipment. In this embodiment, the uplink configuration information may authorize physical random access channel (PRACH) transmissions from a second user equipment on a second set of resources that at least partially overlap with the first set of resources in one or both of a time domain and a frequency domain. In one example, the uplink configuration information identifies orthogonal PRACH sequences for PRACH transmissions on the first and second set of resources. According to another example, the serving eNodeB utilizes an interference cancellation technique to process a multiplicity of received uplink communications.

Another exemplary embodiment relates to a method for wireless communication that comprises receiving uplink configuration information from a serving eNodeB at a non-serving eNodeB, where the non-serving eNodeB is a member of a coordinated multipoint set that includes the serving eNodeB, and where the received uplink configuration information relates to a coordinated uplink operation of the CoMP set. The method further comprises allocating resources for uplink transmissions of a first user equipment associated with the non-serving eNodeB in accordance with the received uplink configuration.

In one exemplary embodiment, the method further includes receiving, at the non-serving eNodeB, uplink communications originated from a second user equipment, where the received uplink communications have been transmitted in accordance with the uplink configuration information. The method also includes conveying at least a portion of the received uplink communications to the serving eNodeB. In one example, the non-serving eNodeB is configured to convey the uplink transmissions over a backhaul communication channel or an over-the-air communication channel.

In another exemplary embodiment, the uplink configuration information identifies a first set of resources that are allocated by the serving eNodeB for scheduled uplink transmissions of a second user equipment on a physical uplink shared channel (PUSCH). The uplink configuration information may be used to avoid or prohibit the non-serving eNodeB from scheduling uplink transmissions for the first user equipment on a second set of resources that at least partially overlap with the first set of resources.

In one exemplary embodiment, the uplink configuration information identifies a first set of resources that are allocated by the serving eNodeB for scheduled uplink transmissions of a second user equipment on a physical uplink shared channel (PUSCH). The uplink configuration information may authorize the non-serving eNodeB to schedule uplink transmissions for the first user equipment on a second set of resources that at least partially overlap with the first set of resources in one or both of a time domain and a frequency domain.

In another exemplary embodiment, the uplink configuration information identifies a first set of resources that are allocated for physical uplink control channel (PUCCH) transmissions from a second user equipment associated with the serving eNodeB. The uplink configuration information may be used to avoid or prohibit physical uplink control channel (PUCCH) transmissions from the first user equipment on a second set of resources that at least partially overlap with the first set of resources.

In another exemplary embodiment, the uplink configuration information identifies a first set of resources that are allocated for physical uplink control channel (PUCCH) transmissions from a second user equipment associated with the serving eNodeB. The uplink configuration information may authorize physical uplink control channel (PUCCH) transmissions from the first user equipment on a second set of resources that at least partially overlap with the first set of resources in one or both of a time domain and a frequency domain.

According to another exemplary embodiment, the uplink configuration information identifies a first set of resources that are allocated for physical random access channel (PRACH) transmissions from a second user equipment. The uplink configuration information may be used to avoid or prohibit physical random access channel (PRACH) transmissions from the first user equipment on a second set of resources that at least partially overlap with the first set of resources.

In another exemplary embodiment, the uplink configuration information identifies a first set of resources that are allocated for physical random access channel (PRACH) transmissions from a second user equipment. The uplink configuration information may authorize physical random access channel (PRACH) transmissions from the first user equipment on a second set of resources that at least partially overlap with the first set of resources in one or both of a time domain and a frequency domain.

Another exemplary embodiment relates to a device that comprises a processor and a memory that stores processor executable code. The processor executable code, when executed by the processor configures the device to receive uplink configuration information from a serving eNodeB at a non-serving eNodeB, where the non-serving eNodeB is part of a coordinated multipoint (CoMP) set of eNodeBs that includes the serving eNodeB, and where the received uplink configuration information relates to a coordinated uplink operation of the CoMP set. The processor executable code, when executed by the processor further configures the device to allocate resources for uplink transmissions of a first user equipment associated with the non-serving eNodeB in accordance with the received uplink configuration.

Another exemplary embodiment relates to a device that comprises a processor and a memory that stores processor executable code. The processor executable code, when executed by the processor configures the device to receive uplink configuration information from a serving eNodeB at a non-serving eNodeB, where the non-serving eNodeB is part of a coordinated multipoint (CoMP) set of eNodeBs, and where the received uplink configuration information relates to a coordinated uplink operation of the CoMP set. The processor executable code, when executed by the processor also configures the device to allocate resources for uplink transmissions of a first user equipment associated with the non-serving eNodeB in accordance with the received uplink configuration.

Still another exemplary embodiment relates to a device that comprises means for identifying, by a serving eNodeB, one or more non-serving eNodeBs that together with the serving eNodeB form a coordinated multipoint (CoMP) set. The device also includes means for transmitting uplink configuration information from the serving eNodeB to the one or more non-serving eNodeBs to facilitate coordinated uplink operation of the CoMP set, as well as means for receiving, at the serving eNodeB, uplink communications originated from one or more user equipment, where the received uplink communications having been transmitted in accordance with the uplink configuration information.

Another exemplary embodiment relates to a device that comprises means for receiving uplink configuration information from a serving eNodeB at a non-serving eNodeB, where the non-serving eNodeB is part of a coordinated multipoint (CoMP) set of eNodeBs that includes the serving eNodeB, and where the received uplink configuration information relates to a coordinated uplink operation of the CoMP set. The device further includes means for allocating resources for uplink transmissions of a first user equipment associated with the non-serving eNodeB in accordance with the received uplink configuration.

Another exemplary embodiment relates to a computer program product, embodied on a non-transitory computer readable medium, that comprises program code for identifying, by a serving eNodeB, one or more non-serving eNodeBs that together with the serving eNodeB form a coordinated multipoint (CoMP) set. The computer program product further includes program code for transmitting uplink configuration information from the serving eNodeB to the one or more non-serving eNodeBs to facilitate coordinated uplink operation of the CoMP set, as well as program code for receiving, at the serving eNodeB, uplink communications originated from one or more user equipment, where the received uplink communications having been transmitted in accordance with the uplink configuration information.

Another exemplary embodiment relates to a computer program product, embodied on a non-transitory computer readable medium, that comprises program code for receiving uplink configuration information from a serving eNodeB at a non-serving eNodeB, where the non-serving eNodeB is part of a coordinated multipoint (CoMP) set of eNodeBs that includes the serving eNodeB, and where the received uplink configuration information relates to a coordinated uplink operation of the CoMP set. The computer program product also includes program code for allocating resources for uplink transmissions of a first user equipment associated with the non-serving eNodeB in accordance with the received uplink configuration.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are illustrated by way of example, and not of limitation, by referring to the accompanying drawings, in which.

DETAILED DESCRIPTION

Figure 1:
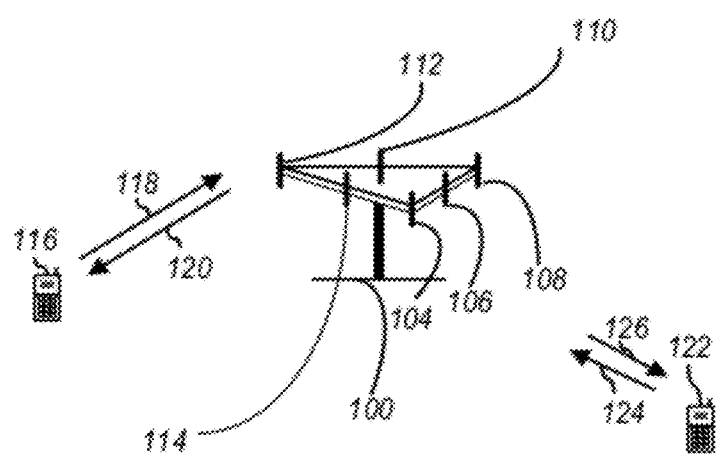
FIG. 1 illustrates a wireless communication system.

In the following description, for purposes of explanation and not limitation, details and descriptions are set forth in order to provide a using understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, wireless node, Node B, evolved NodeB (eNodeB or eNB) or some other network entity. Therefore, in the sections that follow, the terms access point, eNodeB and the like may be used interchangeably to refer to any one of the above noted entities that communicates with a user equipment or wireless terminal in a wireless network. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first eNodeBd with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

As noted earlier, communications in the uplink and downlink between the base station and user equipment can be established through a single-in-single-out (SISO), multiple-in-single-out (MISO), single-in-multiple-out (SIMO) or a multiple-in-multiple-out (MIMO) system. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels (or layers), where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group and may be disposed at various orientations with respect to each antenna and each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beam forming in order to improve the signal-to-noise ratio of the forward links for the different user equipment 116 and 122. Also, a base station that uses beam forming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CDD Cyclic delay diversity
CCDF Complementary cumulative distribution function
CDMA Code division multiple access
CFI Control format indicator
Co-MIMO Cooperative MIMO
CoMP Cooperative multipoint
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel
PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel
RACH Random access channel
TDD Time division duplex.

Figure 2:
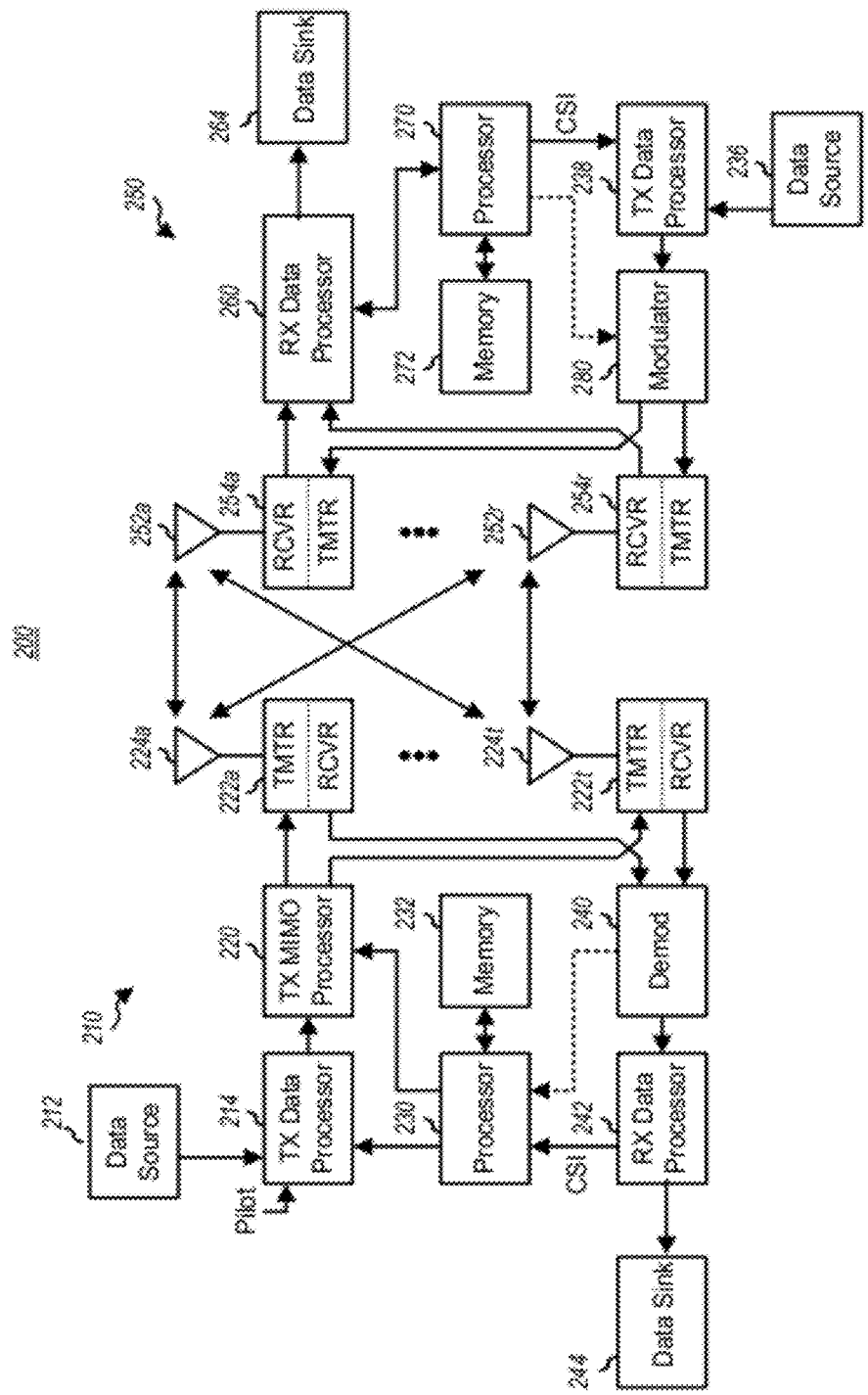
FIG. 2 illustrates a block diagram of a communication system.

FIG. 2 illustrates a block diagram of an exemplary communication system that may accommodate the various embodiments described herein. Communication system 200 can be a MIMO system that comprises a transmitter system 210 (e.g., a base station or access point) and a receiver system 250 (e.g., an access terminal or user equipment). It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as, signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI) (also referred to a channel status information in some embodiments), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which precoding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix (i.e., the precoding matrix indicator (PMI)). In some instances the feedback control signal also includes a rank indicator (RI), which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems, each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

The disclosed embodiments may be used in conjunction with systems that operate in frequency division duplex (FDD) or time division duplex (TDD) modes. In FDD systems, different carrier frequencies are configured for uplink and downlink transmissions. In one exemplary embodiment, each frame includes the same number of uplink subframes and downlink subframes, thus enabling simultaneous uplink and downlink transmissions. In time division duplex (TDD) systems, uplink and downlink transmissions are carried out on the same carrier frequency. As a result, uplink and downlink transmissions within a frame are separated in time. Further, uplink and downlink resources within a TDD frame are not necessarily symmetrically allocated.

The disclosed techniques may also be used in systems having multiple component carriers for uplink and/or downlink transmissions. In particular, in LTE-A based systems, a user equipment can be configured with multiple component carriers by an eNodeB to enable a wider overall transmission bandwidth. Such a configuration may be effected through, for example, layer 3 (i.e., radio resource control (RRC)) operations. In some embodiments, the multiple component carriers may be configured as one primary component carrier (PCC) and one or more secondary component carriers (SCCs). Each component carrier can include a respective forward link as well as a respective reverse link. Each of the forward links may be referred to as a downlink component carrier, whereas each of the reverse links may be referred to an uplink component carrier. In some embodiments, the number of uplink component carriers may differ from the number of downlink component carriers. Additionally, or alternatively, the bandwidth of the aggregated uplink component carriers may be different from the bandwidth of the aggregated downlink component carriers.

Figure 3:
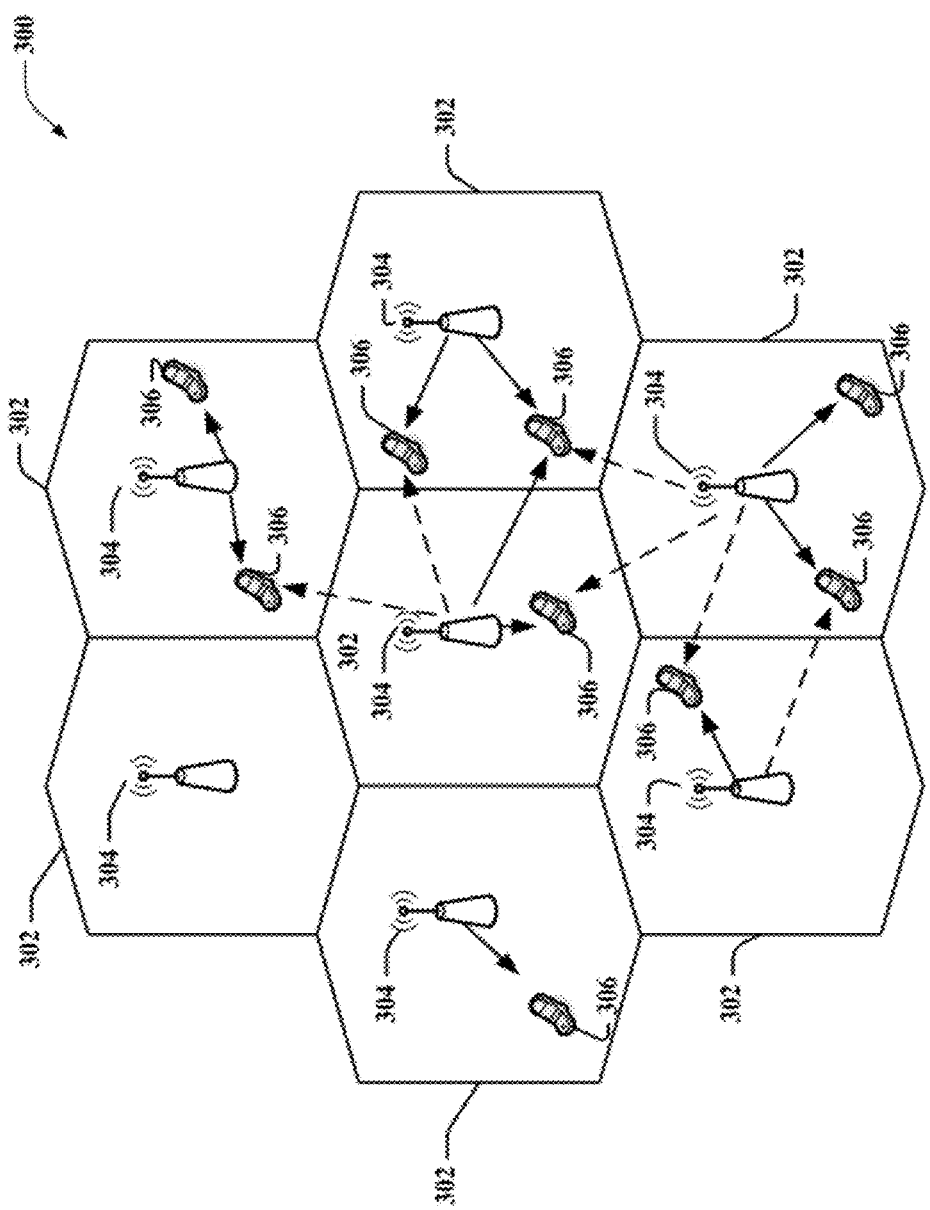
FIG. 3 illustrates an exemplary wireless network that can accommodate the disclosed embodiments.

FIG. 3 illustrates an exemplary access network 300 in an LTE network architecture that can be used in conjunction with the disclosed embodiments. In this example, the access network 300 is divided into a number of cellular regions (cells) 302. An eNodeB 304 is assigned to a cell 302 and is configured to provide an access point to a core network for all the user equipment (UEs) 306 in the cell 302. Each user equipment 306 may communicate with one or more eNodeBs 304 on one or more forward links and/or a reverse links at a particular time, depending upon whether the user equipment 306 is active and whether it is in soft handoff, for example. eNodeBs 304 can form a coordinated network for the transmission and reception of uplink communications. The access network 300 may provide service over a large geographical region, where, for example, the depicted cells 302 may cover a few blocks in a neighborhood.

There is no centralized controller in the example access network 300 of FIG. 3, but a centralized controller may be used in alternative configurations and embodiments. In other configurations, one eNodeB 304 may control the operations of a plurality of cells 302. The eNodeB 304 can be responsible for all radio related functions including radio bearer control, admission control, mobility control, scheduling, security, and connectivity to the serving gateway in a core network. In describing the various entities of FIG. 3, as well as other figures associated with the disclosed embodiments, for the purposes of explanation, the nomenclature associated with a 3GPP LTE or LTE-A wireless network is used. However, it is to be appreciated that the access network 300 may be adapted to operate in other networks such as, but not limited to, an OFDMA wireless network, a CDMA network, a 3GPP2 CDMA2000 network, and the like.

As noted earlier, in some LTE systems communications between the user equipment and the eNodeB can be established through a variety of modes such as SISO, SIMO and MIMO configurations. In existing LTE systems (e.g., LTE Release 8), no uplink MIMO configuration is supported. In such implementations, a user equipment has only one active transmit antenna at a given time and, therefore, requires a single power amplifier. Existing LTE systems may, however, support antenna switching transmit diversity. For example, the user equipment may be equipped with two or more antennas, one of which is selected for uplink transmissions at a given time. In open-loop antenna switching, each antenna is selected alternatively for transmissions over a particular time period (e.g., a time slot). In closed-loop antenna switching, on the other hand, the eNodeB decides which antenna is to be used per subframe, or time-slot, basis. The eNodeB decisions are then signaled to the user equipment to effect antenna switching. The conventional LTE systems further do not support macro diversity. Therefore, different eNodeBs may not be aware of the scheduling decisions of other eNodeBs.

According to certain exemplary embodiments, an access network, such as the exemplary access network 300 of FIG. 3, may utilize coordinated multipoint (CoMP) transmission and/or reception of signals. In such embodiments, coordinated transmissions from multiple antennas at different cells 302 can be used to improve system performance. The collection of eNodeBs 304 that participate in coordinated multi-point transmission and/or reception of signals are sometimes referred to as the "CoMP set" of eNodeBs (or cells). A CoMP set can comprise a serving eNodeB (or cell) and one or more non-serving eNodeBs (or cells) that directly or indirectly communicate with a user equipment. Coordinated transmissions and/or receptions may be particularly beneficial for user equipment that are located far from the antenna sites within a cell. For user equipment that are located at the cell edges, the received signal strengths can be lower than optimum signal levels due to the distant location of the user equipment from the serving cell center. Moreover, such user equipment experience higher interferences levels from neighboring cell transmissions. In systems that utilize CoMP transmission and/reception, close coordination between geographically separated eNodeBs can improve signal reception and/or transmission through joint scheduling, transmission and processing of the signals. The information that facilitates such joint operations can be exchanged between the eNodeBs over the backhaul (e.g. X2 interface) and/or over the air (OTA).

The use of downlink CoMP enables coordinated transmissions from multiple eNodeBs that improve downlink coverage and increase downlink data rates and system throughput. For instance, by transmitting the same signal from multiple antennas at different cell sites, the signal-to-noise ratio of the received signal at the user equipment can be improved.

For the uplink, the present disclosure provides techniques to enable CoMP reception which may include the reception of uplink transmissions at multiple, geographically separated eNodeBs. Procedures and operations are described to facilitate coordinated communication and processing of uplink signals. Further, the present disclosure provides coordination techniques that can be utilized to facilitate communications over different uplink channels which include, but are not limited to, physical uplink shared channel (PUSCH), physical uplink control channel (PUCCH), physical random access channel (PRACH) and the like.

In certain embodiments, uplink CoMP is effected for PUSCH transmissions. In these embodiments, cells in the CoMP set coordinate the scheduling of uplink transmissions by a user equipment. For example, coordination for PUSCH transmissions can be accomplished by implementing coordinated silencing. In particular, when one cell (e.g., the serving cell) schedules a user equipment on a set of resources, scheduling of other user equipment on the same set of resources (or partially overlapping resources) by the cells in the CoMP set can be avoided. As such, transmissions received on a particular set of resource blocks at any one of the eNodeBs of the CoMP set can be uniquely associated with uplink transmissions of a particular user equipment. It should be noted that such resources can include resource blocks of an LTE system. More generally, however, such resources can include time, frequency and other resources that may be used for wireless transmissions in a communication network.

In another example, where one eNodeB, such as the serving eNodeB, schedules uplink transmissions on a particular set of resources, other eNodeBs in the CoMP set can also schedule additional user equipment on the same (or overlapping) set of resources using spatial division multiple access (SDMA) techniques. It should be noted that the two sets of resources (i.e., the set of resources scheduled by the serving eNodeB and the set of resources scheduled by the non-serving eNodeB) can be at least partially overlapping in one or both of time and/or frequency domains. In one example, the SDMA technique can be implemented using precoding techniques. Similar to the discussions set forth above in connection with the MIMO communication system 200 of FIG. 2, uplink transmissions from each user equipment can include a precode matrix (or precode vector) to ensure that uplink transmissions received from different user equipment at each eNodeB within the CoMP set are sufficiently decorrelated from each other. The received transmissions at each eNodeB can thus be uniquely associated with the corresponding user equipment. Additionally, or alternatively, uplink coordinated beam forming techniques may be used to allow uplink transmissions from multiple user equipment on the same time-frequency resource blocks within the CoMP set.

As noted earlier, the rank (or rank indicator value) indicates how many independent data streams can be accommodated by the user equipment/eNodeB in a spatial multiplexing scheme. In embodiments that utilize coordinated silencing, the rank is determined in-part based on the capabilities of the serving eNodeB. In particular, the rank is limited by min {Tx, Rx}, where min represent the minimum value, Tx is the number of transmit channels (e.g., antennas) associated with the user equipment, and Rx represents the number of receive channels associated with the serving eNodeB. In embodiments that utilize SDMA techniques to enable the use of the same (or overlapping) resource blocks for uplink transmissions by different user equipment, the rank may be determined by considering the CoMP set as a whole. In particular, the rank associated with a user equipment can be limited by min {Tx, Rx(all)}, where Rx(all) represents the number of receive channels associated with all eNodeBs in the CoMP set. As such, the reception capabilities of all eNodeBs in the CoMP set are considered for determining the number of spatially multiplexed streams that can be accommodated.

Due to a potential increase in the rank value, a larger field for signaling the rank indicator (RI) may be needed. As noted earlier, the RI can be sent from the user equipment to the eNodeB. The RI is typically transmitted as part of a channel state information (also referred to as channel status report) from a user equipment to an eNodeB. An increased RI bitwidth may also affect uplink grants that are transmitted to the user equipment on physical downlink control channel (PDCCH). In one exemplary embodiment, the RI bitwidth is determined based on the number of user equipment transmit antennas rather than based on the number of receive channels of the CoMP set. Such a selection can be advantageous since typically a small number of user equipment transmit antennas are implemented to effect cost savings. Therefore, the user equipment transmit antennas may be considered the bottleneck for implementing spatially multiplexed layers in a CoMP set.

Similar considerations may be taken into account for demodulation reference signal (DMRS) fields. DMRS is associated with uplink transmissions of data (on PUSCH) and control information (on PUCCH), and is primarily used for channel estimation to enable coherent demodulation of uplink transmissions. Since the number of spatial layers for PUSCH transmissions in a CoMP set can potentially increase, additional DMRS signals can be provided in accordance with the disclosed embodiments to enable demodulation of additional uplink data streams.

In some embodiments, enhanced receiver techniques such as interference cancellation at the eNodeBs of the CoMP set can be used to alternatively, or additionally, enable the reception of multiple uplink transmissions associated with different user equipment. Such techniques include, but are not limited to, inter-cell interference randomization, frequency-domain spreading, power control and the like. In one example, when multiple uplink transmissions are received, the received transmission with the highest signal to noise ratio (SNR) is decoded first, and if the decoding is not successful, other uplink transmissions with lower SNR values are decoded.

In certain exemplary embodiments, the design and transmission of sounding reference signals (SRS) are enhanced to account for a plurality of eNodeBs in a CoMP set. SRS are transmitted by the user equipment on the uplink to enable channel quality estimation at different frequencies. SRS signals, which are transmitted on particular time-frequency resources of the uplink channel, can be used by the serving eNodeB to, for example, enable frequency-selective scheduling of uplink transmissions on resource blocks with good quality. In systems that do not utilize CoMP transmission/reception, each eNodeB serves a particular number of user equipment with no or little coordination from other eNodeBs. In contrast, according to the present disclosure, in a CoMP set a multiplicity of eNodeBs collectively serve all user equipment that are associated with the eNodeBs of the CoMP set. In this regard, additional SRS signaling resources may be allocated to accommodate an increase in the number of cells that are in communication with each user equipment.

In some embodiments, various multiplexing schemes are utilized to schedule the SRS for each user equipment associated with the CoMP set. In one example, code division multiplexing (CDM) is utilized. In particular, in LTE systems that rely on Zadoff-Chu or similar sequences for SRS transmissions, different cyclic shifts of the sequences can be used to effect CDM. Alternatively, or additionally, different spreading codes (or scrambling codes) can be used to decorrelate different SRS transmissions on the same time/frequency resources. In another example, frequency division multiplexing (FDM) is utilized to assign particular frequency resources to SRS transmissions associated with different cells. In yet another example, time division multiplexing (TDM) is used to transmit SRS associated with different cells in different time resources. It should be noted that in some embodiments, a combination of some or all of the above noted multiplexing techniques may be used for SRS transmissions in a CoMP set.

The disclosed embodiments further facilitate the operations of some or all of the eNodeBs in the CoMP set that participate in uplink receptions on the PUSCH. To this end, if one eNodeB within the CoMP set decodes the PUSCH transmissions from a user equipment, it can convey the decoded information to other eNodeBs (e.g., the serving eNodeB) in the CoMP set. As noted earlier, such communications between the eNodeBs of the CoMP set can take place over the backhaul and/or over the air. In one example, the serving eNodeB further transmits a positive acknowledgement (ACK) or a negative acknowledgement (NACK) on the downlink to acknowledge the reception of PUSCH transmissions by one or several eNodeBs in the CoMP.

PUCCH transmissions with uplink CoMP are also facilitated in accordance with the present disclosure. In some embodiments, the PUCCH transmissions may be linked to a PDCCH of the serving eNodeB. To improve PUCCH coverage, some or all of the eNodeBs in the CoMP set can try to decode PUCCH transmissions, and if one eNodeB succeeds, the decoded PUCCH information is conveyed to the serving eNodeB. To further improve PUCCH reception among the eNodeBs of the CoMP set, collision avoidance techniques across the cells may be utilized. These collision avoidance techniques can be applied to PUCCH resources that are dynamically or semi-statically configured. Dynamically configured resources are allocated for use by the user equipment only for a specific period (e.g., one slot or a subframe). Semi-statically configured resources, on the other hand, are allocated for use by a user equipment as long as the user equipment is connected to the cell.

In one example, which can be utilized with dynamically configured PUCCH resources, if a user equipment associated with the serving eNodeB is transmitting on PUCCH, no other user equipment associated with the collection of eNodeBs in the CoMP set is allowed to use the same (or overlapping) resources on PUCCH. For example, if a user equipment is transmitting an ACK on PUCCH corresponding to particular PDSCH transmission, all other user equipment, through the cooperation of the eNodeBs in the CoMP set, are prohibited from using the same PUCCH resources at the same time.

In one example, collisions between multiple PUCCH transmissions are circumvented by prohibiting PDCCH transmissions by non-serving eNodeBs that can result in the usage of the same PUCCH resources by multiple user equipment. For instance, the serving eNodeB can communicate with other eNodeBs in the CoMP set to identify the specific PDCCH resources that are allocated for downlink transmissions to a user equipment, thereby also identifying the linked PUCCH resources that must be used by the user equipment to conduct that necessary uplink communications.

In other exemplary embodiments, various multiplexing techniques may be utilized to enable PUCCH transmissions from multiple user equipment on the same set of resources. Such multiplexing techniques can, for example, be applied to dynamically configured PUCCH resources. Similar to the discussions set forth above in connection with PUSCH transmissions, in some examples, FDM/TDM techniques may be used to transmit multiple PUCCH transmissions on multiplexed frequency and/or time resources. In other examples, CDM techniques can be used to transmit multiple streams on PUCCH using the same set of time/frequency resources by, for example, implementing cyclically shifted sequences or orthogonal spreading codes (e.g., using Walsh sequences). In still other examples, a combination of some or all of the above noted multiplexing techniques may be utilized to decorrelate or orthogonalize multiple transmissions on the same PUCCH resources.

Some exemplary embodiments facilitate uplink collision avoidance for PUCCH transmission involving various semi-statically configured parameters. In particular, the configuration of resources for parameters that include, but are not limited to, channel quality indicator (CQI), semi-static ACK/NACK and/or scheduling request (SR) can be coordinated across the eNodeBs of the CoMP set. The CQI is a parameter transmitted by the user equipment to assist the eNodeBs in determining appropriate modulation and coding schemes for downlink transmissions. The SR is transmitted by the user equipment to request PUSCH resources, and ACK/NACKs are transmitted in response to downlink data packets to confirm proper/improper of the data packets. In one example, the serving eNodeB identifies the resources that are allocated for transmission of semi-static parameters by the UE, and further communicates the same to other eNodeBs in the CoMP set. The other eNodeBs in the CoMP set then avoid allocating the same PUCCH resources for uplink transmission.

As also noted in connection with PUSCH transmissions received in a CoMP set, advanced receiver techniques can be additionally, or alternatively, used to decode multiple PUCCH transmissions that are received on the same set of resources. For example, a received transmission with the highest SNR may be decoded first, and if the decoding fails, the remaining received transmissions can be decoded in the reverse order of their respective SNR values (i.e., the signal with lowest SNR is decoded last).

In certain embodiments, uplink CoMP is utilized to facilitate transmissions on the physical random access channel (PRACH). In LTE systems, PRACH is used by the user equipment to conduct a random access procedure. A random access procedure establishes or re-establishes a connection between a user equipment and an eNodeB. A random access procedure may serve a number of purposes, such as to allow access when establishing a radio link (e.g., moving from an RRC_IDLE to an RRC_CONNECTED state), to re-establish a radio link upon a radio link failure, to establish uplink synchronization for a user equipment which has lost or has not acquired uplink synchronization, to facilitate handover operations when a new synchronization with new cell needs to be established, and the like. Random access procedures in LTE systems can be categorized as contention-based and contention-free procedures.

In a contention-based procedure, the user equipments initiates a request for a random access procedure by transmitting a special sequence known as random access preamble to the eNodeB. The preamble is selected from a particular group of preamble sequences associated with that eNodeB. In response to receiving a request, the eNodeB transmits certain random access parameters and resource allocations to the user equipment. For example, the response can include timing information, a Cell Radio Network Temporary Identity (C-RNTI) or a random access radio network temporary identifier (RA-RNTI), a scheduling grant for uplink transmissions and the like.

In a contention-free random access procedure, the eNodeB initiates the random access procedure by transmitting a request to the user equipment. Such a request comprises a reserved preamble index that enables the user equipment to identify and transmit the reserved preamble to the eNodeB. In response, the eNodeB transmits a message to the user equipment that includes the necessary parameters and scheduling information for subsequent communications.

Exemplary embodiments can facilitate random access procedures in a CoMP set. In conventional systems with only a single eNodeB (i.e., the serving cell), the allocation of resources for PRACH transmissions is carried out exclusively by the serving eNodeB. In contrast, in systems that utilize a CoMP set in accordance with exemplary embodiments, through the cooperation of multiple eNodeBs, random access procedures may be carried out in a larger geographical area. In one example, some or all eNodeBs in the CoMP set try to detect PRACH transmissions from a user equipment. If one eNodeB succeeds, the decoded PRACH transmissions are conveyed to the serving eNodeB of the user equipment. The decoded information includes, but is not limited to, a detected sequence ID or preamble, timing information, frequency information, energy metric and the like.

In order to facilitate the coordination of eNodeB operations, PRACH-related information can be shared among the eNodeBs of the CoMP set. The communication of PRACH-related information in the CoMP set can be carried out over the backhaul or over the air. In one example embodiment, the random access preambles associated with each eNodeB within the CoMP set are shared among some or all eNodeBs within the CoMP set. As a result, each eNodeB can monitor PRACH transmissions and ascertain the identity of the target eNodeB in the CoMP set. Once the target eNodeB (i.e., the serving eNodeB of the user equipment) is identified, the random access request can be conveyed to the target eNodeB.

Random access procedures in a CoMP set can further be facilitated by applying collision avoidance techniques to PRACH resources that may be shared among various eNodeBs of a CoMP set. In one example, if one eNodeB has PRACH transmissions on a first set of resources, the other eNodeBs in the CoMP set do not schedule PRACH transmissions on the same resource blocks. To this end, the first set of resources can be identified and conveyed to all other eNodeBs in the CoMP set. As discussed in connection with PUSCH and PUCCH transmissions, other eNodeBs can avoid collisions by scheduling PRACH transmissions, if needed, on different time and/or frequency resources. In another example embodiment, the same set of resources may be used for scheduling PRACH transmissions using, for example, orthogonal PRACH sequences to decorrelate the transmissions.

Additionally, or alternatively, enhanced receiver techniques, such as interference cancellation techniques, can be used to improve the detection and decoding of PRACH transmissions. For example, the received PRACH transmissions can be combined from two or more eNodeBs to improve the detection capability of PRACH information.

Figure 4:
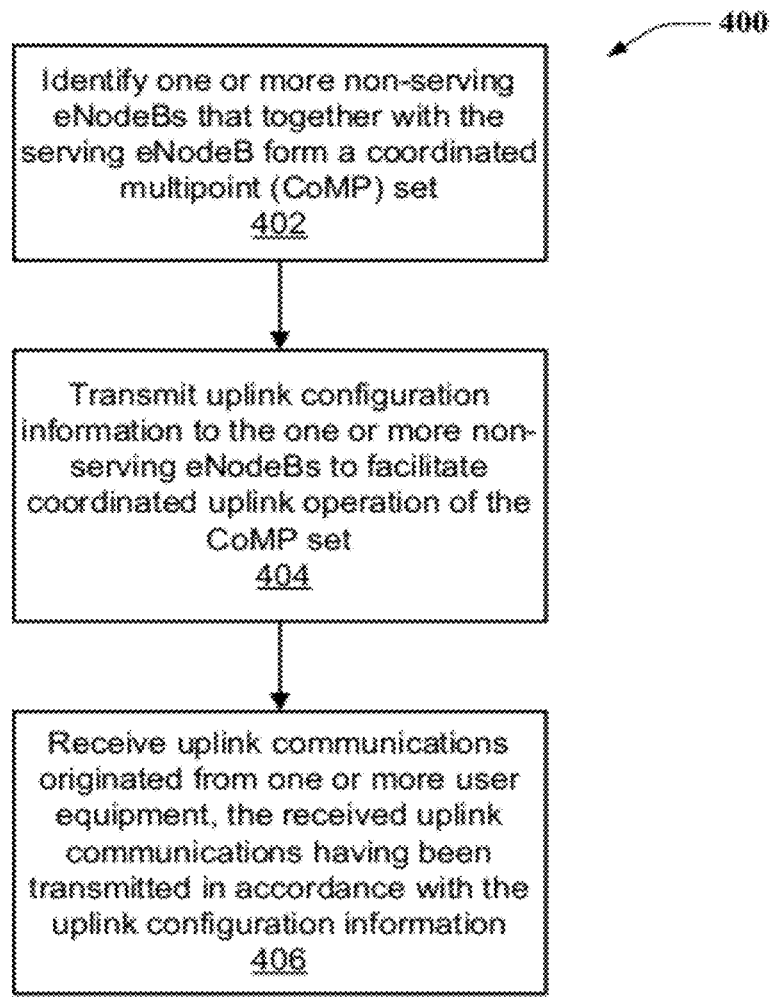
FIG. 4 illustrates exemplary operations that may be carried out at a serving eNodeB to facilitate uplink transmissions.

FIG. 4 illustrates a set of exemplary operations 400 that are carried out in accordance with an exemplary embodiment to facilitate uplink communications in a CoMP set of eNodeBs. The operations 400 of FIG. 4 can be carried out by, for example, a serving eNodeB in the CoMP set. At 402, one or more non-serving eNodeBs that together with the serving eNodeB form a CoMP set are identified. At 404, uplink configuration information is transmitted to the one or more non-serving eNodeBs to facilitate coordinated uplink operation of the CoMP set. In some embodiments, the uplink configuration information is related to any one of PUSCH, PUCCH and/or PRACH transmissions. For example, such uplink configuration information can identify a first set of resources that are allocated by the serving eNodeB for scheduled uplink transmissions of a first user equipment on PUSCH, PUCCH and/or PRACH. Such uplink configuration information can further prohibit a second eNodeB in the CoMP set from scheduling uplink transmissions on PUSCH, PUCCH and/or PRACH for any other user equipment on a second set of resources that at least partially overlap with the first set of resources.

Referring back to FIG. 4, at 406, uplink communications that originate from one or more user equipment are received. Such communications may be transmitted by the user equipment in accordance with the uplink configuration information. For example, such communications may correspond to uplink transmissions directly received at the serving eNodeB from a user equipment associated with the serving eNodeB. In other examples, such communications may correspond to uplink transmissions from the same eNodeB that are first received by a non-serving eNodeB and subsequently conveyed to the serving eNodeB over a backhaul or similar interface supporting communication between the eNodeBs of the CoMP set.

Figure 5:
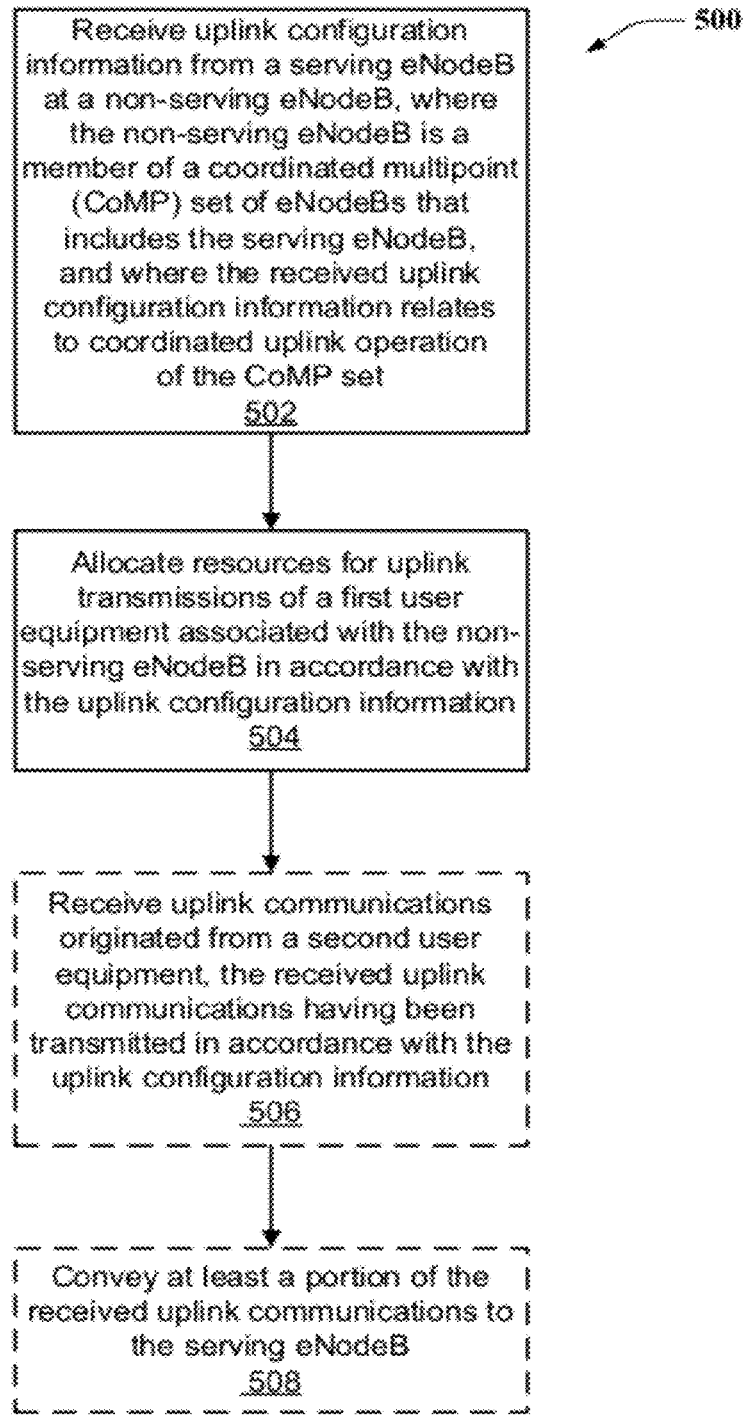
FIG. 5 illustrates exemplary operations that may be carried at a non-serving eNodeB to facilitate uplink transmissions.

FIG. 5 illustrates exemplary operations 500 that are carried out in accordance with one embodiment to facilitate uplink communications in a CoMP set of eNodeBs. The operations 500 of FIG. 5 can be carried out by, for example, a non-serving eNodeB in the CoMP set. At 502, uplink configuration information is received from a serving eNodeB, where the non-serving eNodeB is identified as part of a CoMP set of eNodeBs. The received uplink configuration information can relate to a coordinated uplink operation of the CoMP set. For example, the uplink configuration information relate to PUSCH, PUCCH and/or PRACH transmissions and may be intended for use by one, several, or all members of the CoMP set. At 504, resources for uplink transmissions of a first user equipment, which is associated with the non-serving eNodeB, are allocated in accordance with the uplink configuration information. For example, a set of resources different from those used by the serving eNodeB are allocated for uplink transmissions of the first user equipment.

In some embodiments, the set of exemplary operations 500 continues at 506, where uplink communications originating from a second user equipment are received. The second user equipment can be, for example, a user equipment associated with the serving cell of the CoMP set. Such communications may have been conducted in accordance with the earlier discussed uplink configuration information. At 508, at least a portion of the received uplink communications is conveyed to the serving eNodeB. The conveyance of the information at 508 can be carried out, for example, over the backhaul and/or over the air.

Figure 6:
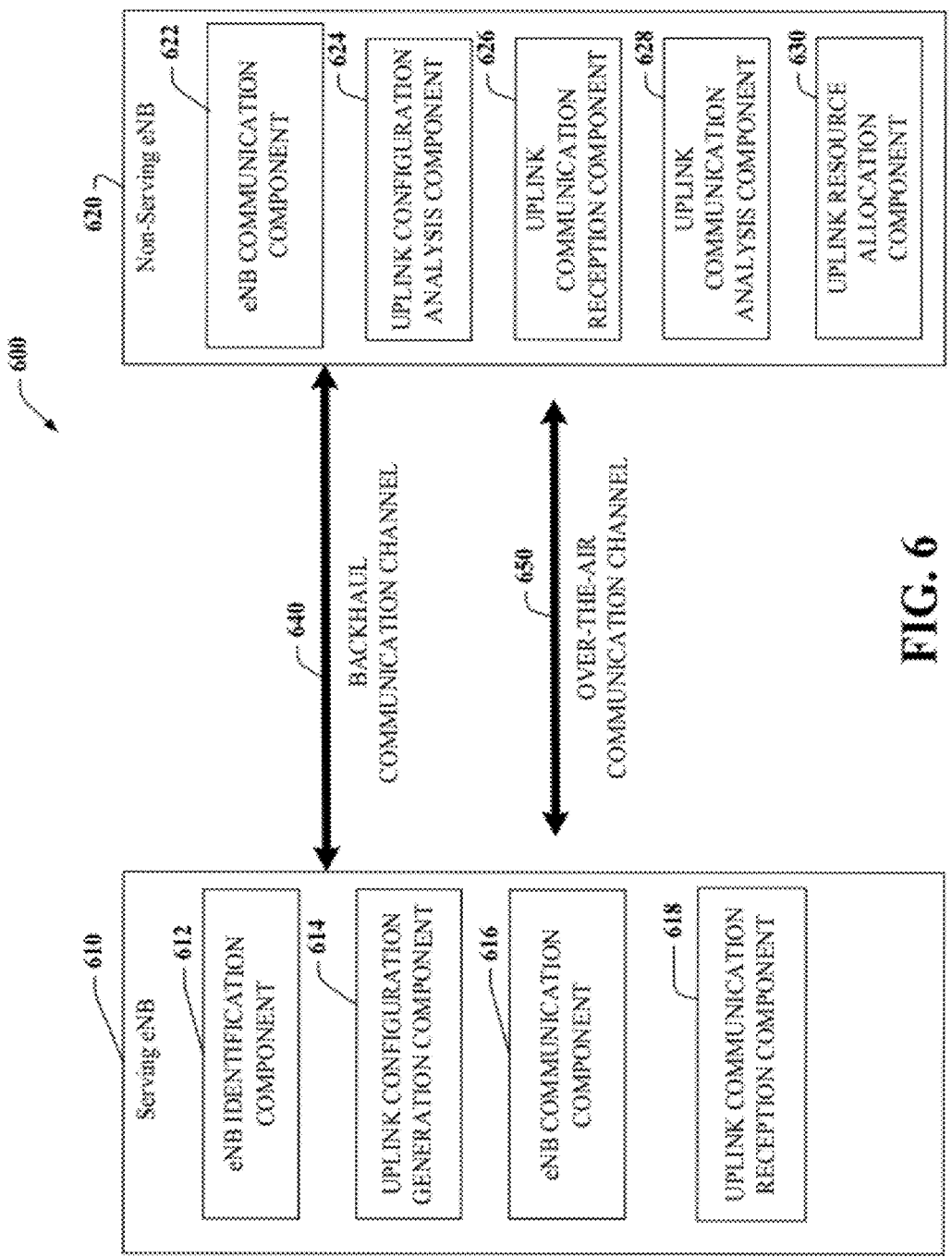
FIG. 6 illustrates a system within which various embodiments may be implemented.

FIG. 6 illustrates an exemplary system 600 capable of supporting the various operations described above. The system 600 includes a serving eNodeB (eNB) 610 that can transmit and/or receive information, signals, data, instructions, commands, bits, symbols and the like. The serving eNB 610 can be in communication with one or more non-serving eNBs 620 that collectively comprise a CoMP set of eNodeBs. It should be noted that while FIG. 6 only illustrates one non-serving eNB 620, the serving eNB 610 and the non-serving eNB 620 can be in communication with other eNodeBs comprising the CoMP set. The communications among the eNodeBs in the CoMP set can take place over a backhaul communication channel 640 or via an over-the-air communication channel 650.

The serving eNB 610 may include an eNB identification component 612 that is configured to identify one or more non-serving eNBs 620 that, together with the serving eNB 610, form a coordinated multipoint (CoMP) set. Each of the serving eNB 610 and non-serving eNB 620 can be in communication with one or more user equipment (not shown) within the geographical coverage area of the CoMP set. The serving eNB 610 also includes an uplink configuration generation component 614 that can generate various uplink configuration information related to, for example, transmissions associated with PUSCH, PUCCH, PRACH, and the like.

The serving eNB 610 also includes an eNB communication component 616 that can be configured to transmit/receive various information and data to/from other eNodeBs such as the non-serving eNB 620. For example, the eNB communication component 616 can be configured to transmit uplink configuration information to the non-serving eNB 620 and/or receive at least a portion of a user equipment's uplink communications which are conveyed from the non-serving eNB 620. The eNB communication component 616 can be configured to transmit/receive over the backhaul communication channel 640 and/or through over-the-air communication channel 650. The serving eNB 610 can also include an uplink communication reception component 618 that is configured to receive uplink communications from one or more user equipment.

The non-serving eNB 620 of FIG. 6 comprises an eNB communication component 622 that can transmit/receive information, signals, data, instructions, commands, bits, symbols and the like to/from the serving eNB 610 and/or other non-serving eNBs (not shown) in the CoMP set. The non-serving eNB can also include an uplink configuration analysis component 624 that can be configured to analyze and evaluate the uplink configuration information associated with the CoMP set. For example, the uplink configuration analysis component 624 can identify particular resource blocks that are configured for use on PUSCH for uplink transmissions of a user equipment associated with the serving eNB 610. Such an analysis can, for example, assist the non-serving eNB 620 to avoid scheduling PUSCH transmissions of another user equipment on the same set of resource blocks.

The non-serving eNB 620 further comprises an uplink communication reception component 626 that can be configured to receive user equipment uplink communications. The non-serving eNB 620 may also include an uplink communication analysis component 628 that is configured to analyze the received uplink communications. In some embodiments, the uplink communication analysis component 628 can ascertain whether the received uplink communication belongs to another eNodeB (e.g., the serving eNB 610) within the CoMP set. In such embodiments, the non-serving eNB 620 may convey at least a portion of the received uplink communication to the appropriate eNodeB via the eNB communication component 622. The non-serving eNB 620 can also include an uplink resource allocation component 630 that is configured to allocate uplink resources for its associated user equipment. In some embodiments, the resource allocation component 630 can allocate resources that are different from those allocated by the serving eNB 610 for use by another user equipment. In some embodiments, the resource allocation component 630 can allocate the same (or overlapping) resources as those allocated by the serving eNB 610 for use by another user equipment. In such scenarios, various multiplexing and collision avoidance techniques can employed to enable proper reception and decoding of multiple data streams.

It should be noted that the serving eNB 610 and non-serving eNB 620 of FIG. 6 may additionally include transmitting components (not shown), which enable these entities to transmit downlink signals. Further, the serving eNB 610 and non-serving eNB 620 can be configured to operate in wireless networks that utilize multiple component carriers.

Figure 7:
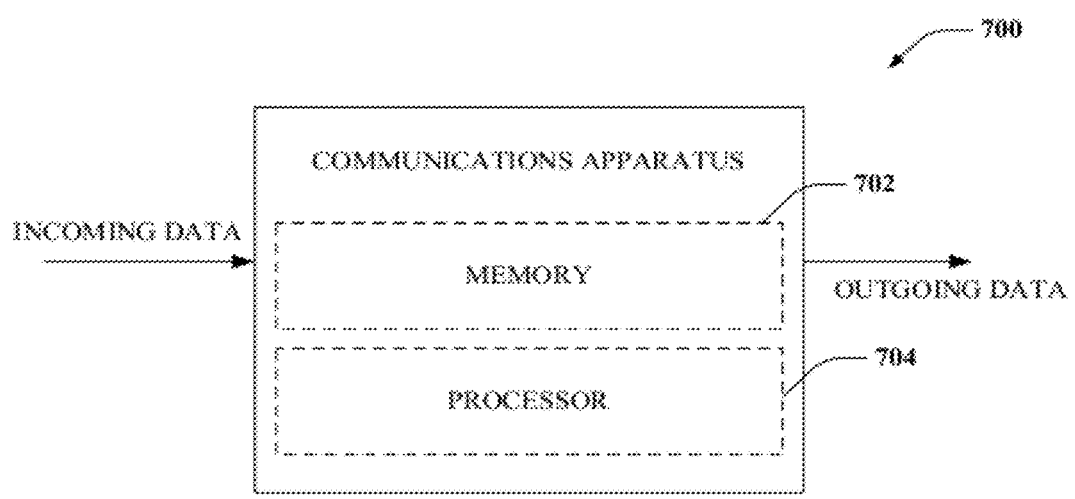
FIG. 7 illustrates an apparatus within which various embodiments may be implemented.

FIG. 7 illustrates an apparatus 700 within which the various disclosed embodiments may be implemented. In particular, the apparatus 700 that is shown in FIG. 7 may comprise at least a portion of an eNodeB (such as the serving eNB 610 and non-serving eNB 620 of FIG. 6) or at least a portion of a user equipment and/or at least a portion of a transmitter system or a receiver system (such as the transmitter system 210 and the receiver system 250 that are depicted in FIG. 2). The apparatus 700 that is depicted in FIG. 7 can be resident within a wireless network and receive incoming data via, for example, one or more receivers and/or the appropriate reception and decoding circuitry (e.g., antennas, transceivers, demodulators and the like). The apparatus 700 that is depicted in FIG. 7 can also transmit outgoing data via, for example, one or more transmitters and/or the appropriate encoding and transmission circuitry (e.g., antennas, transceivers, modulators and the like). Additionally, or alternatively, the apparatus 700 that is depicted in FIG. 7 may be resident within a wired network.

FIG. 7 further illustrates that the apparatus 700 can include a memory 702 that can retain instructions for performing one or more operations, such as signal conditioning, analysis and the like. Additionally, the apparatus 700 of FIG. 7 may include a processor 704 that can execute instructions that are stored in the memory 702 and/or instructions that are received from another device. The instructions can relate to, for example, configuring or operating the apparatus 700 or a related communications apparatus. It should be noted that while the memory 702 that is depicted in FIG. 7 is shown as a single block, it may comprise two or more separate memories that constitute separate physical and/or logical units. In addition, the memory while being communicatively connected to the processor 704, may reside fully or partially outside of the apparatus 700 that is depicted in FIG. 7. It is also to be understood that one or more components, such as the various components associated with the serving eNB 610 and the non-serving eNB 620 of FIG. 6 and the user equipment 306 that is shown in FIG. 3, can exist within a memory such as memory 702.

It should be noted that for purposes of simplicity of explanation, the operations in FIGS. 4 and 5 are shown and described as a series of acts. However, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed embodiments.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 700 of FIG. 7 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. Therefore, the disclosed embodiments can be implemented on non-transitory computer readable media. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of computer-readable medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The techniques described herein may be implemented with modules (e.g., procedures, functions and so on) that perform the functions described herein. Software codes may be stored in memory units and executed by processors. The memory units may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques. The disclosed embodiments can also be used in conjunction with systems that use multiple component carriers. For example, the disclosed embodiments can be used in conjunction with LTE-A systems.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 306 of FIG. 3), a serving eNodeB (e.g., 610 of FIG. 6) and/or a non-serving eNB (e.g., 620 of FIG. 6). In the alternative, the processor and the storage medium may reside as discrete components in a user equipment (e.g. 306 of FIG. 3), a serving eNodeB (e.g., 610 of FIG. 6) and/or a non-serving eNB (e.g., 620 of FIG. 6). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for wireless communication, comprising:
identifying, by a serving eNodeB, one or more non-serving eNodeBs that together with the serving eNodeB form a coordinated multipoint (CoMP) set;
transmitting uplink configuration information from the serving eNodeB to the one or more non-serving eNodeBs to facilitate coordinated uplink operation of the CoMP set, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of a first user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set; and receiving, at the serving eNodeB, uplink communications originated from one or more user equipment, the received uplink communications having been transmitted in accordance with the uplink configuration information.

2. The method of claim 1, wherein the first eNodeB is the serving eNodeB and the second eNodeB is a non-serving eNodeB.

3. The method of claim 1, wherein:
the first set of resources are allocated by the serving eNodeB for scheduled uplink transmissions of the first user equipment on a physical uplink shared channel (PUSCH), and
the uplink configuration information further authorizes a non-serving eNodeB in the CoMP set to schedule uplink transmissions for a second user equipment on the second set of resources.

4. The method of claim 1, wherein the SDMA technique comprises at least one of coordinated beam forming or precoding techniques.

5. The method of claim 1, wherein a bitwidth allocation associated with the rank indicator in an uplink grant is determined in accordance with Min {Tx, Rx(all)}.

6. The method of claim 1, wherein the uplink communications received at the serving eNodeB comprise uplink transmissions that are initially received at a particular non-serving eNodeB and subsequently conveyed to the serving eNodeB by the particular non-serving eNodeB.

7. The method of claim 6, wherein the serving eNodeB is configured to receive the conveyed uplink transmissions over a backhaul communication channel or an over-the-air communication channel.

8. The method of claim 6, further comprising transmitting an acknowledgment (ACK) by the serving eNodeB to the user equipment from which the uplink communications were originated.

9. The method of claim 1, wherein:
the first set of resources are allocated for transmission of sounding reference signal (SRS) transmissions associated with the serving eNodeB; and
the uplink configuration information further identifies one or more parameters associated with a multiplexing technique for transmission of sounding reference signals (SRSs) associated with the one or more non-serving eNodeBs in the CoMP set on the second set of resources.

10. The method of claim 9, wherein the multiplexing technique is selected from a group of multiplexing techniques consisting of:
code division multiplexing,
frequency division multiplexing, and
time division multiplexing.

11. The method of claim 1, wherein:
the first set of resources are allocated for physical uplink control channel (PUCCH) transmissions from the first user equipment associated with the serving eNodeB; and the uplink configuration information further authorizes PUCCH transmissions from a second user equipment on the second set of resources.

12. The method of claim 11, wherein the PUCCH transmissions are carried out in accordance with a multiplexing technique selected from a group of multiplexing techniques consisting of:
code division multiplexing,
frequency division multiplexing, and
time division multiplexing.

13. The method of claim 11, wherein one or more eNodeBs in the CoMP set dynamically or semi-statically configure the first and the second set of resources.

14. The method of claim 1, wherein:
the first set of resources are allocated for physical random access channel (PRACH) transmissions from the first user equipment; and
the uplink configuration information further authorizes PRACH transmissions from a second user equipment on the second set of resources.

15. The method of claim 14, wherein the uplink configuration information further identifies orthogonal PRACH sequences for PRACH transmissions on the first and second set of resources.

16. The method of claim 1, wherein the serving eNodeB utilizes an interference cancellation technique to process a multiplicity of received uplink communications.

17. A method for wireless communication, comprising:
receiving uplink configuration information from a serving eNodeB at a non-serving eNodeB, wherein the non-serving eNodeB is a member of a CoMP set that includes the serving eNodeB, and wherein the received uplink configuration information relates to coordinated uplink operation of the CoMP set; and
allocating resources for uplink transmissions of a first user equipment associated with the non-serving eNodeB in accordance with the received uplink configuration, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of another user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx (all) represents the number of receive channels of all eNodeBs in the CoMP set.

18. The method of claim 17, further comprising:
receiving, at the non-serving eNodeB, uplink communications originated from a second user equipment, the received uplink communications having been transmitted in accordance with the uplink configuration information; and
conveying at least a portion of the received uplink communications to the serving eNodeB.

19. A wireless communications device, comprising:
a processor; and
a memory coupled to the processor, the memory comprising executable code which, when executed by the processor, configures the wireless communications device to:
identify, at a serving eNodeB, one or more non-serving eNodeBs that together with the serving eNodeB form a coordinated multipoint (CoMP) set;
transmit uplink configuration information from the serving eNodeB to the one or more non-serving eNodeBs to facilitate coordinated uplink operation of the CoMP set, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of a first user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set; and
receive, at the serving eNodeB, uplink communications originated from one or more user equipment, the received uplink communications having been transmitted in accordance with the uplink configuration information.

20. The wireless communications device of claim 19, wherein the first eNodeB is the serving eNodeB and the second eNodeB is a non-serving eNodeB.

21. The wireless communications device of claim 19, wherein:
the first set of resources are allocated by the serving eNodeB for scheduled uplink transmissions of the first user equipment on a physical uplink shared channel (PUSCH), and
the uplink configuration information further authorizes a non-serving eNodeB in the CoMP set to schedule uplink transmissions for a second user equipment on the second set of resources.

22. The wireless communications device of claim 19 wherein the SDMA technique comprises at least one of coordinated beam forming or precoding techniques.

23. The wireless communications device of claim 19, wherein a bitwidth allocation associated with the rank indicator in an uplink grant is determined in accordance with Min{Tx, Rx(all)}.

24. The wireless communications device of claim 19, wherein the uplink communications received at the serving eNodeB comprise uplink transmissions that are initially received at a particular non-serving eNodeB and subsequently conveyed to the serving eNodeB by the particular non-serving eNodeB.

25. The wireless communications device of claim 24, wherein the processor executable code, when executed by the processor, configures the device to receive the conveyed uplink transmissions over a backhaul communication channel or an over-the-air communication channel.

26. The wireless communications device of claim 24, wherein the processor executable code, when executed by the processor, configures the device to further transmit an acknowledgment (ACK) to the user equipment from which the uplink communications were originated.

27. The wireless communications device of claim 19, wherein:
the first set of resources are allocated for transmission of sounding reference signal (SRS) transmissions associated with the serving eNodeB; and
the uplink configuration information further identifies one or more parameters associated with a multiplexing technique for transmission of sounding reference signals (SRSs) associated with the one or more non-serving eNodeBs in the CoMP set on the second set of resources.

28. The wireless communications device of claim 27, wherein the multiplexing technique is selected from a group of multiplexing techniques consisting of:
code division multiplexing,
frequency division multiplexing, and
time division multiplexing.

29. The wireless communications device of claim 19, wherein:
the first set of resources are allocated for physical uplink control channel (PUCCH) transmissions from the first user equipment associated with the serving eNodeB; and
the uplink configuration information further authorizes PUCCH transmissions from a second user equipment on the second set of resources.

30. The wireless communications device of claim 29, wherein the PUCCH transmissions are carried out in accordance with a multiplexing technique selected from a group of multiplexing techniques consisting of:
code division multiplexing,
frequency division multiplexing, and
time division multiplexing.

31. The wireless communications device of claim 29, wherein the one or more eNodeBs in the CoMP set dynamically or semi-statically configure the first and the second set of resources.

32. The wireless communications device of claim 19, wherein
the first set of resources are allocated for physical random access channel (PRACH) transmissions from the first user equipment; and
the uplink configuration information further authorizes PRACH transmissions from a second user equipment on the second set of resources.

33. The wireless communications device of claim 32, wherein the uplink configuration information further identifies orthogonal PRACH sequences for PRACH transmissions on the first and second set of resources.

34. The wireless communications device of claim 19, wherein the serving eNodeB is configured to utilize an interference cancellation technique to process a multiplicity of received uplink communications.

35. A wireless communications device, comprising:
a processor; and
a memory coupled to the processor, the memory comprising processor executable code which, when executed by the processor, configures the wireless communications device to:

receive uplink configuration information from a serving eNodeB at a non-serving eNodeB, wherein the non-serving eNodeB is a member of a coordinated multipoint (CoMP) set of eNodeBs that includes the serving eNodeB, and wherein the received uplink configuration information relates to coordinated uplink operation of the CoMP set; and allocate resources for uplink transmissions of a first user equipment associated with the non-serving eNodeB in accordance with the received uplink configuration, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of another user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set.

36. The wireless communications device of claim 35, wherein the processor executable code, when executed by the processor, further configures the wireless communications device to:

receive, at the non-serving eNodeB, uplink communications originated from a second user equipment, the received uplink communications having been transmitted in accordance with the uplink configuration information; and convey at least a portion of the received uplink communications to the serving eNodeB.

37. A wireless communications device, comprising:
means for identifying, by a serving eNodeB, one or more non-serving eNodeBs that together with the serving eNodeB form a coordinated multipoint (CoMP) set;

means for transmitting uplink configuration information from the serving eNodeB to the one or more non-serving eNodeBs to facilitate coordinated uplink operation of the CoMP set, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of a first user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set; and means for receiving, at the serving eNodeB, uplink communications originated from one or more user equipment, the received uplink communications having been transmitted in accordance with the uplink configuration information.

38. A wireless communications device, comprising:
means for receiving uplink configuration information from a serving eNodeB at a non-serving eNodeB, wherein the non-serving eNodeB is a member of a coordinated multipoint (CoMP) set of eNodeBs including the serving eNodeB, and wherein the received uplink configuration information relates to coordinated uplink operation of the CoMP set; and means for allocating resources for uplink transmissions of a first user equipment associated with the non-serving eNodeB in accordance with the received uplink configuration, the uplink configuration information including an indication for a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of another user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set.

39. A computer program product, embodied on a non-transitory computer readable medium, comprising:
program code for identifying, by a serving eNodeB, one or more non-serving eNodeBs that together with the serving eNodeB form a coordinated multipoint (CoMP) set;

program code for transmitting uplink configuration information from the serving eNodeB to the one or more non-serving eNodeBs to facilitate coordinated uplink operation of the CoMP set, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of a first user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set; and program code for receiving, at the serving eNodeB, uplink communications originated from one or more user equipment, the received uplink communications having been transmitted in accordance with the uplink configuration information.

40. The computer program product of claim 39, wherein the first eNodeB is the serving eNodeB and the second eNodeB is a non-serving eNodeB.

41. The computer program product of claim 39, wherein:
the first set of resources are allocated by the serving eNodeB for scheduled uplink transmissions of the first user equipment on a physical uplink shared channel (PUSCH), and
the uplink configuration information further authorizes a non-serving eNodeB in the CoMP set to schedule uplink transmissions for a second user equipment on the second set of resources.

42. The computer program product of claim 39, wherein the SDMA technique comprises at least one of coordinated beam forming or precoding techniques.

43. The computer program product of claim 39, wherein a bitwidth allocation associated with the rank indicator in an uplink grant is determined in accordance with Min{Tx, Rx(all)}.

44. The computer program product of claim 39, wherein the uplink communications received at the serving eNodeB comprise uplink transmissions that are initially received at a particular non-serving eNodeB and subsequently conveyed to the serving eNodeB by the particular non-serving eNodeB.

45. The computer program product of claim 39, wherein:
the first set of resources are allocated for transmission of sounding reference signal (SRS) transmissions associated with the serving eNodeB; and
the uplink configuration information further identifies one or more parameters associated with a multiplexing technique for transmission of sounding reference signals (SRSs) associated with the one or more non-serving eNodeBs in the CoMP set on the second set of resources.

46. The computer program product of claim 39, wherein:
the first set of resources are allocated for physical uplink control channel (PUCCH) transmissions from the first user equipment associated with the serving eNodeB; and
the uplink configuration information further authorizes PUCCH transmissions from a second user equipment on the second set of resources.

47. The computer program product of claim 39, wherein:
the first set of resources are allocated for physical random access channel (PRACH) transmissions from the first user equipment; and
the uplink configuration information further authorizes PRACH transmissions from a second user equipment on the second set of resources.

48. The computer program product of claim 39, wherein the serving eNodeB utilizes an interference cancellation technique to process a multiplicity of received uplink communications.

49. A computer program product, embodied on a non-transitory computer readable medium, comprising:
program code for receiving uplink configuration information from a serving eNodeB at a non-serving eNodeB, wherein the non-serving eNodeB is a member of a coordinated multipoint (CoMP) set of eNodeBs that includes the serving eNodeB, and wherein the received uplink configuration information relates to coordinated uplink operation of the CoMP set; and
program code for allocating resources for uplink transmissions of a first user equipment associated with the non-serving eNodeB in accordance with the received uplink configuration, the uplink configuration information comprising an indication to a second eNodeB in the CoMP set of scheduling information and authorizing the second eNodeB to use a second set of resources for uplink transmissions that at least partially overlap with a first set of resources allocated by a first eNodeB in the CoMP set for scheduled uplink transmissions of another user equipment, wherein the second set of resources at least partially overlap with the first set of resources in one or both of a time domain and a frequency domain, the uplink configuration information further comprising an indication of a spatial division multiple access (SDMA) technique used for the uplink transmissions on the first and second set of resources, wherein a rank of a user equipment associated with the CoMP set is determined in accordance with Min{Tx, Rx(all)}, where Min represents the minimum value, Tx represents the number of transmit channels of the user equipment and Rx(all) represents the number of receive channels of all eNodeBs in the CoMP set.

50. The computer program product of claim 49, further comprising:
program code for receiving, at the non-serving eNodeB, uplink communications originated from a second user equipment, the received uplink communications having been transmitted in accordance with the uplink configuration information; and
program code for conveying at least a portion of the received uplink communications to the serving eNodeB.

* * * * *